United States Patent [19]

Nilsson

[11] Patent Number: 4,948,211

[45] Date of Patent: Aug. 14, 1990

[54] METHOD AND APPARATUS FOR OPTICAL IMAGING USING A SMALL, FLAT, REFLECTING SURFACE

[75] Inventor: Thomy H. Nilsson, Charlottetown, Canada

[73] Assignee: Canadian Patents and Development Ltd., Ottawa, Canada

[21] Appl. No.: 305,095

[22] Filed: Feb. 2, 1989

Related U.S. Application Data

[63] Continuation-in-part of Ser. No. 87,309, Aug. 20, 1987, abandoned.

[51] Int. Cl.[5] .......................... G02B 5/18; G03B 19/00
[52] U.S. Cl. ................................. 350/162.11; 354/354
[58] Field of Search ...................... 350/162.11, 23, 629, 350/409, 445, 361, 363, 320, 321, 162.12; 258/240; 427/145; 250/366; 354/354, 403

[56] References Cited

PUBLICATIONS

Thomy H. Nilsson, "Pinhead Mirror: A Previously Undiscovered Imaging Device?", Applied Optics, vol. 25, No.1 17, pp. 2863-2864, Sep. 1, 1986.
Pinhole Journal, vol. 4, No. 1, Apr. 1988, pp. 2-5, "Pinhead Mirrors: Imaging, . . . of Light" by T. Nilsson.
Scientific American, vol. 256, No. 3, Mar. 1987, pp. 88-95, "Optical Neural Computers" by Abu-Mostafa et al.

Primary Examiner—Bruce Y. Arnold
Assistant Examiner—James Phan
Attorney, Agent, or Firm—Yoshiharu Toyooka

[57] ABSTRACT

An image forming technique using a small, flat mirror is disclosed. A real, inverted image of an object is formed with infinite depth of field when the diameter of this mirror is between 0.15 and 0.4 millimeters. In smaller diameters, this forms a diffraction pattern image of an object. The optimal diameters depend on wavelength of the light and the distances involved.

6 Claims, 2 Drawing Sheets

METHOD AND APPARATUS FOR OPTICAL IMAGING USING A SMALL, FLAT, REFLECTING SURFACE

This application is a continuation-in-part of an application Ser. No. 087,309, filed on Aug. 20, 1987, now abandoned.

FIELD OF THE INVENTION

The present invention relates to optically forming an image of an object and in particular is directed to an imaging technique which involves a pinhead mirror (an optical mirror of a substantially point sized, flat, reflecting surface).

BACKGROUND OF THE INVENTION

Many various devices are used to optically form a real image of an object, e.g. the concave mirror, pinhole lens, convex lens, graded refractive index lens, etc. However, except for the pinhole lens, the other devices have limited depth of field and require sufficient space to preclude their incorporation into small, integrated optical devices. Pinhole lenses that are smaller than those used to form images can form a diffraction pattern that uniquely represents an object without resembling the object. The pinhole lens can only form a real image or diffraction pattern in direct line with the object and only behind the lens from the object.

Whereas a pinhole lens functions by virtue of its limited aperture, a pinhead mirror functions by virtue of its limited extent. The present invention is a reflecting analog of the pinhole lens. For the lack of an accepted terminology for the present invention, "the pinhead mirror" "pinhead surface" etc. are used throughout the present specification. The pinhead mirror is therefore an optical mirror of a substantially point sized, flat, reflecting surface.

OBJECT OF THE INVENTION

It is therefore an object of the present invention to provide a method and an apparatus for forming optically an image of an object by using a pinhead mirror.

It is another object of the present invention to provide a method and an apparatus for forming a diffracted image of an object by using a pinhead mirror.

SUMMARY OF THE INVENTION

Briefly stated, the present invention is an optical imaging apparatus for forming an image of an object. The apparatus includes an optically reflecting pinhead surface and means for directing light from the said object onto the said optically reflecting pinhead surface to reflect the light along optical paths. It further has light receiving means which is provided in a plane located in the optical paths for receiving the light reflected back from the surface so that the reflected light forms the image of the object on the plane.

The present invention is further directed to an optical method of forming an image of an object. The method includes steps of directing light from the object onto an optically reflecting pinhead surface and directing light from the object reflected back from the reflecting pinhead surface along optical paths. The method further includes a step of providing light receiving means in a plane located in the optical paths for receiving the reflected light which forms the image of the object on the plane.

The present inventor presented an article describing the principle of the present invention in Applied Optics, Vol. 25, No. 17, 1 Sept. 1986, pp. 2863-2864.

BRIEF DESCRIPTION OF THE DRAWINGS

The foregoing and the other objects and features of the invention may be readily understood with reference to the following detailed description taken in conjunction with the accompanying drawings in which.

DETAILED DESCRIPTION OF THE PREFERRED EMBODIMENTs

Figure 1:
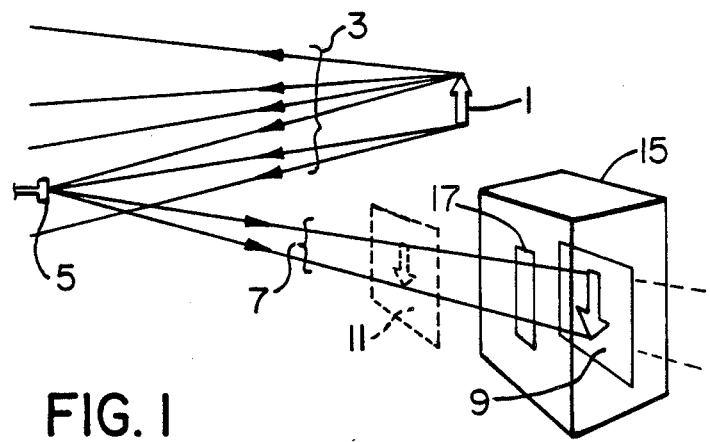
FIG. 1 is a schematic illustration of the present invention for producing a real image.

Referring to the accompanying FIG. 1, a schematic illustration of the present invention is shown. An object 1 is illuminated by an external light or can be self illuminating. Light rays 3 (in the case of external light, scattered rays) are emitted radially from all the points of the object. However only one of those rays from each point will be reflected by a pinhead mirror 5. The law of reflection ensures that the reflected rays 7 maintain their distant vectors in an orderly array. Accordingly, at plane 9 in the paths of the reflected rays exists an inverted real image of the object. Therefore light receiving means e.g. photographic screen, photodetectors etc. or simply a screen for image viewing can be located on the plane 9. Images of the object also exist at adjacent planes such as I! in the paths of the reflected rays, though their usable range of positions is limited by the shadow of the mirror and diffraction effects. The principle is operable as discussed above. However in most practical cases, an appropriate light limiting means may be needed for limiting the ambient light from interfering with the real image on the light receiving means. In the figure, a box 15 having a hole 17 is illustrated as such a means. However it should be understood that any means to limit ambient light from falling on the plane can be used. In certain circumstances where there is very little extraneous light , e.g. outerspace etc. such light limiting means may be unneccessary.

To produce pinhead mirrors, shards from a shattered front surface mirror were filed and then patiently honed to an approximately round shape with the aid of a dissecting microscope. Five pinhead mirrors, approximately 0.65, 0.55, 0.4, 0.3, and 0.15 mm in diameter, were prepared. The operation of these mirrors was tested as follows: an intensely bright object was produced by focussing the source filaments on a ground glass plate positioned 10 mm behind a 35-mm slide containing WALK printed in white on black background. The light source was a carefully shielded 750 w incandescent lamp. To further reduce stray light, a 15-mm aperture mask was located 10 mm in front of the slide, and the entire assembly was shrouded in black velvet cloth.

For optimal imaging, the distance of these five mirrors from the luminous object proved to be 140, 135, 70, 45, and 30 mm, respectively. The sharpest image was produced by the 0.3-mm mirror at 0.1 to beyond 1.3 m from the mirror. Second best was the 0.4-mm mirror image at 0.14-0.8 m. The largest mirror produced only a poor image at best, around 0.5 m from the mirror. Faintness made it difficult to evaluate the smallest mirror, but its image appeared to be in focus at any distance beyond 0.03 m.

These observations demonstrated that a small, flat, reflecting surface, having a certain range of diameters, can form a real image. The focal lengths correspond approximately to those expected of a pinhole lens based on the equation found below.

Since the pinhead mirror would seem to be a reflecting analog of the pinhole lens, one would expect its geometrical characteristics to be similar. The imaging characteristics of the pinhole lens are described by the equation $$1/f_1 + 1/f_2 = 1/(s^2/\lambda)$$

where $f_1$ is the object distance, $f_2$ is the image distance, s is the radius of the pinhole, and $\lambda$ is the wavelength of light. Using 550 nm to represent the wavelength of the white light used in the above test, this formula predicts somewhat longer object and image distances than those observed, but essentially it appears that the pinhead mirror obeys principles similar to those of the pinhole lens. However, the pinhead mirror is unlikely to replace the pinhole lens in photographic imaging due to the ease with which a pinhole can block all stray light from its image. Nevertheless, the pinhead mirror can do something a pinhole lens cannot—it can scan its input or redirect its image over a wide range of directions. These advantages may make pinhead mirror valuable in integrated optics and three dimensional scanning devices.

Since a pinhead mirror appears to be a reflecting analog of the pinhole lens, smaller mirrors could be expected to produce images where diffraction effects predominate over the real image—as occurs with smaller pinhole lenses. To examine the ability of pinhead mirrors to produce diffraction patterns, some smaller pinhead mirrors of approximately 0.1 and 0.07 mm in diameter were made. A 5 milliwatt, 633 nm, helium-neon laser beam was directed onto these mirrors. These mirrors produced diffraction pattern images of the beam that consisted of a central bright spot and many surrounding dark and bright fringes.

These observations demonstrate that pinhead mirrors can also be used to form diffraction patterns, particularly if their size is reduced below that which is optimal for producing a real image.

Figure 2:
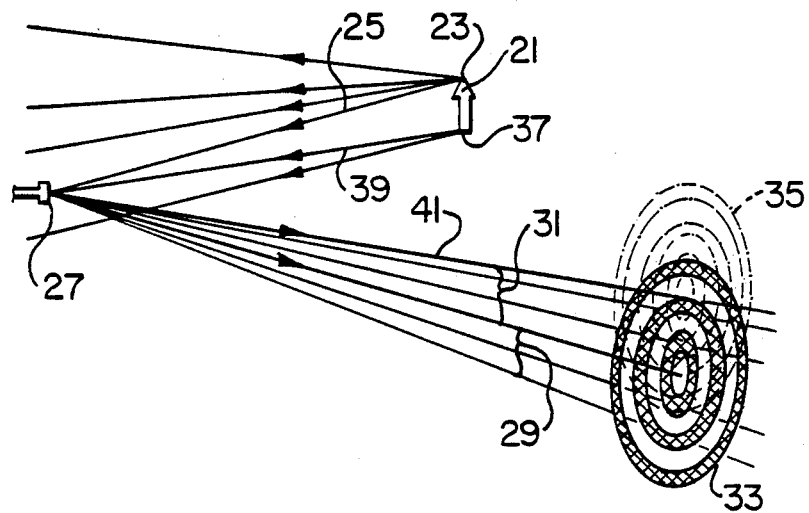
FIG. 2 is a schematic illustration of the present invention for producing a diffracted image.

The accompanying FIG. 2 shows how pinhead mirrors form diffracted images. An object 21 is illuminated by external light or can be self illuminating. Any point on the object, such as point 23, radiates light in all directions, but only one ray from each point, such as ray 25 from point 23, will reach a pinhead mirror 27 and be reflected. While the law of reflection tends to ensure that the reflected rays from each point maintain their vectors in an orderly array, the limited extent of these smaller pinhead mirrors causes the reflected light to be diffracted over a range of directions such as indicated by rays at 29 and 31 which originated from point 23. Accordingly, at any plane in the paths of the reflected rays, there exists a diffraction pattern of the light from each point on the object—such as pattern 33 from point 23, or pattern 35 from point 37 via ray 39 and rays at 41. Any light detector or receiving means can be located at a plane to display or receive such a diffraction pattern. The overlapping diffraction patterns from all points on the object uniquely represent that object, though their composite pattern does not resemble that object.

The general case for the location of the first order minimum in the diffraction pattern produced by a circular aperture is described in the following equation:

$$\sin \theta = 1.22\lambda/d$$

where "$\theta$" is the angular distance of the first order minimum from the center of the pattern, "$\lambda$" is the wavelength of light, and "d" is the diameter of the aperture. The roughly circular, 0.1 mm diameter mirror produced a ring shaped, first order minimum at a distance of 17.5 mm from the center of a diffraction pattern located 2.35 meters from the pinhead mirror.

These observations demonstrate that pinhead mirrors can be used to form diffraction patterns. The diffraction pattern formed by the limited extent of a pinhead mirror is similar to the diffraction pattern formed by the limited aperture of a pinhole lens. Furthermore, since the direction of light in optical principles is reversible, it follows that pinhead mirrors can also be used to reconstruct an image from a diffraction pattern.

Figure 3:
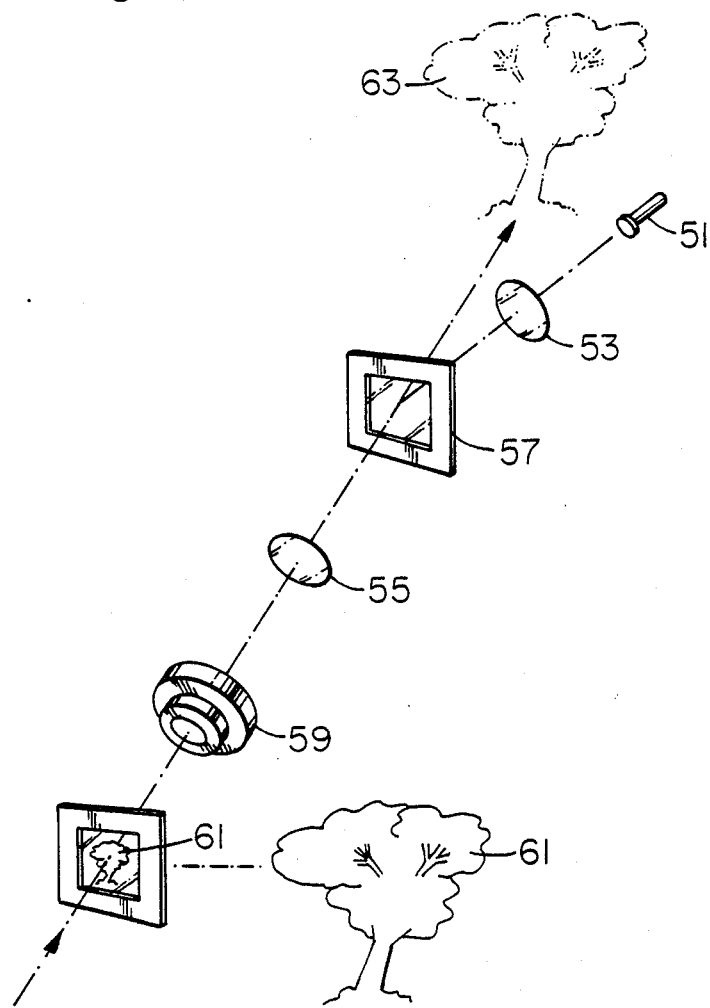
FIG. 3 is a schematic illustration of the optical neural computer using a pinhead mirror.

It should therefore be possible to use pinhead mirrors to build a neural optical computer to "recognize" pictures similar to that proposed by Abu-Mostafa and Psaltis, Scientific American, Mar. 1987, Vol. 256, No. 3 pp 88-95, "Optical Neural Computers". FIG. 3 illustrates such a computer. Here the pinhead mirror is 51 and focussing lenses are 53 and 55. A picture in the computer's memory is shown by 57 and a liquid crystal light valve is located at 59. A picture of an unknown object is designated by 61 and the recognized output is produced at 63. To the extent that the diffraction pattern of the unknown picture is similar to the diffraction pattern of the picture in memory. the light valve will project an output that is similar to the input. Substituting a pinhead mirror diffracting device for a pinhole diffracting device halves the number of needed components. This saving is due to the pinhead mirror's unique ability to redirect its diffraction pattern in various directions.

The pinhead mirror fills a theoretical gap in our knowledge of basic optics. While one of the other imaging devices may be preferrable for most imaging purposes, the special ability of the pinhead mirror to aim its image over a range of directions including back towards the object while simultaneously restoring its original topology to various magnifications with great depth of field o while producing a diffraction pattern might prove useful in optical computing, holography and integrated optical systems. While the experiments were conducted by using light with wavelengths in the visible range the principle of the invention evidently will operate similarly with wavelengths outside this range.

I claim:

1. An optical method of forming an image of an object on a light receiving means, comprising steps of:
    directing a set of beams of light from an object onto an optically reflecting pinhead surface of a substantially point size in relation to the wavelength of the said light,
    directing the said set of beams of light reflected from the said reflecting pinhead surface along predetermined optical paths by positioning the said pinhead surface with respect to the said object to form the said optical paths,
    positioning the said light receiving means in a plane located in the said optical paths for receiving the said set of reflected beams of light which form the image of the said object on the said plane, and preventing any beams of light which do not follow the said optical paths from falling on the light receiving means.

2. The optical method according to claim 1, wherein:
the said light from the said object has wavelengths in the visible range,
and
the said pinhead surface has a diameter of from 0.15 to 0.4 mm to form a real image of the said object.

3. The optical method according to claim 1, wherein:
the said light from the said object has wavelengths in the visible range
and
the said pinhead surface has a diameter less than 0.15 mm to form a diffraction image of the said object.

4. An optical imaging apparatus for forming an image of an object, comprising:
an optically reflecting pinhead surface, of a substantially point size in relation to the wavelength of the said light located with respect to the said pinhead surface to direct a set of beams of light from the said object onto the said optically reflecting pinhead surface to reflect the said set of beams of light along predetermined optical paths,
light receiving means provided in a plane located in the said optical paths for receiving the said set of beams of light reflected back from the said surface which light forms the image of the said object on the said plane, and
limiting means for preventing any beams of light which do not follow the said optical paths from falling on the light receiving means.

5. The optical imaging apparatus according to claim 4, wherein:
the said light from the said object is visible light,
and
the said pinhead surface has a diameter in the range of 0.15 to 0.4 mm to form a real image of the said object.

6. The optical imaging apparatus according to claim 4, wherein:
the said light from the said object is visible light,
and
the said pinhead surface has a diameter less than 0.15 mm to form a diffracted image of the said object.

* * * * *